United States Patent [19]

Etter

[11] 4,006,205
[45] Feb. 1, 1977

[54] MEANS FOR APPLYING ADDITIVES TO INDUSTRIAL GAS

[76] Inventor: Berwyn E. Etter, 10355 Paradise Blvd., Treasure Island, Fla. 33740

[22] Filed: Oct. 14, 1975

[21] Appl. No.: 622,403

Related U.S. Application Data

[63] Continuation-in-part of Ser. No. 558,945, March 17, 1975, Pat. No. 3,924,648, which is a continuation of Ser. No. 358,005, May 7, 1973, abandoned.

[52] U.S. Cl. .......................... 261/39 R; 137/205.5; 137/209; 137/592; 261/119 R; 261/122; 261/DIG. 47
[51] Int. Cl.² .......................................... B01F 3/04
[58] Field of Search ............. 261/39 R, 39 D, 39 B, 261/39 E, 64 R, 64 D, 122, 124, DIG. 47, 119 R; 137/39, 45, 79, 90, 3, 205.5, 209, 592; 431/4, 126

[56] References Cited

UNITED STATES PATENTS

| | | | |
|---|---|---|---|
| 2,049,333 | 7/1936 | Snethkamp | 261/122 |
| 2,177,111 | 10/1939 | Hubbard | 137/90 X |
| 2,245,672 | 6/1941 | Hunt | 261/39 E X |
| 2,342,602 | 2/1944 | Reitz, Jr. | 261/DIG. 47 |
| 2,442,871 | 6/1948 | Friedrich | 137/79 X |
| 2,650,810 | 9/1953 | Nordell | 261/DIG. 47 |
| 3,157,196 | 11/1964 | Thomas | 137/45 X |
| 3,290,023 | 12/1966 | Sarto | 261/39 B X |
| 3,746,323 | 7/1973 | Buffington | 261/122 |

FOREIGN PATENTS OR APPLICATIONS

| | | | |
|---|---|---|---|
| 18,871 | 12/1907 | United Kingdom | 261/122 |

*Primary Examiner*—Tim R. Miles
*Assistant Examiner*—Richard L. Chiesa
*Attorney, Agent, or Firm*—Zarley, McKee, Thomte & Voorhees

[57] ABSTRACT

A means for applying additives to industrial gas wherein a closed container has an industrial gas inlet port and a discharge port, a quantity of liquid gas additive in the bottom of said container, a movable arm means mounted within said container and adapted to pivot into and out of said liquid gas additive, a thermal spring element secured to the arm means to cause said arm to dip into the liquid gas additive when the temperature within the container is at least 0° F., and to progressively lift the arm out of the gas additive as the temperature is increased, a conduit means connecting the outer end of said arm with the inlet port to cause the industrial gas to be discharged either into or above the liquid gas additive depending on the attitude of the arm.

7 Claims, 2 Drawing Figures

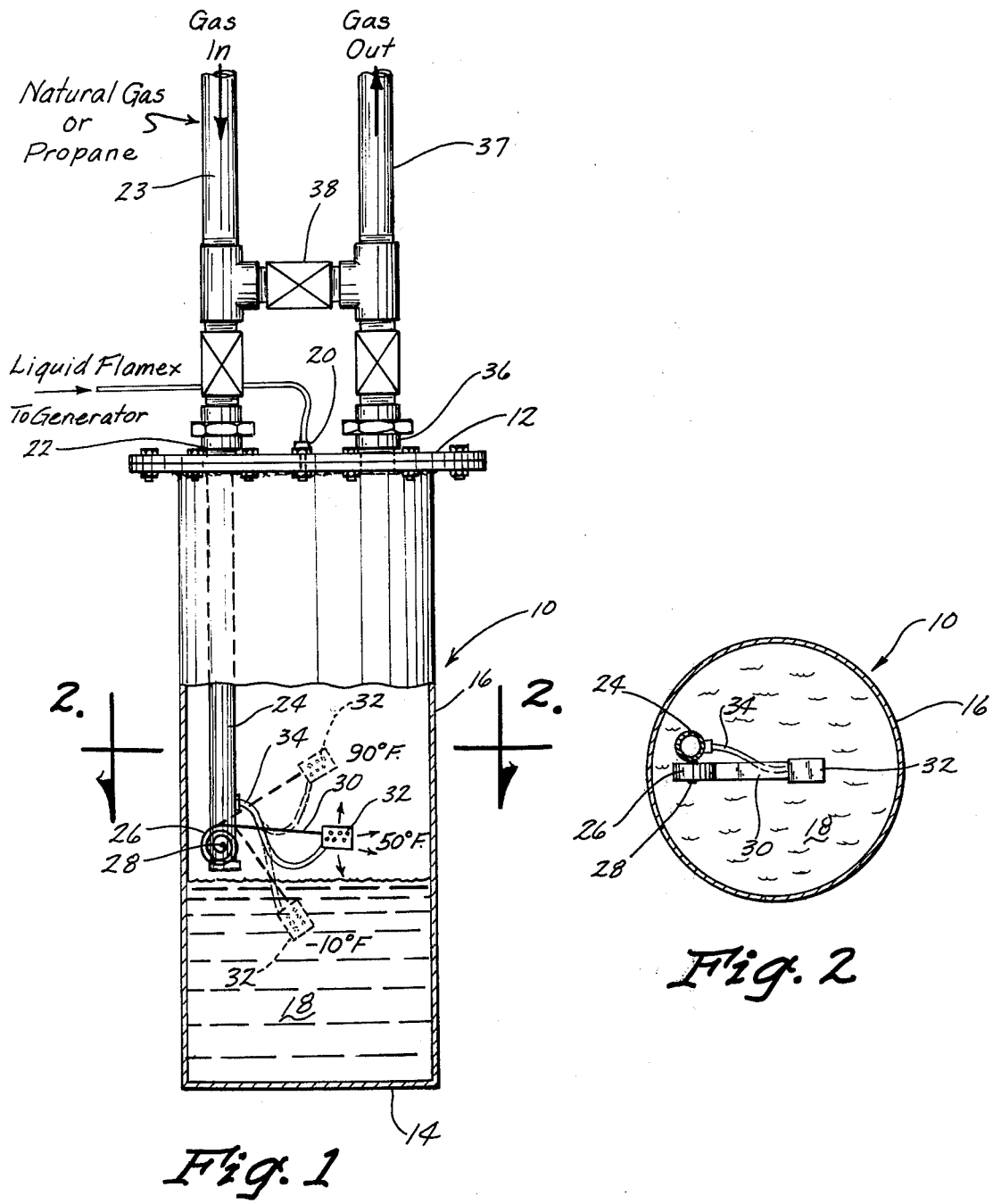

MEANS FOR APPLYING ADDITIVES TO INDUSTRIAL GAS

This is a continuation-in-part application of Ser. No. 558,945 filed Mar. 17, 1975, now U.S. Pat. No. 3,924,648, which was a continuation of application Ser. No. 358,005 filed May 7, 1973 which is now abandoned.

BACKGROUND OF THE INVENTION

It is desirable to mix certain industrial gases, such as natural gas or propane, with certain additives to improve the efficiency of the industrial gases. A generator for achieving this mixture is disclosed in my co-pending application Ser. No. 558,945 filed Mar. 17, 1975, now U.S. Pat. No. 3,924,648. The generators of the prior art normally introduce the industrial gas into a closed container into which a quantity of the liquid gas additive has been introduced. The industrial gas is either percolated through the gas additive or is permitted to mix with the vapors from the liquid gas additive to create the desired gas product. These general phenomena and the gas additive are described in my co-pending application.

One of the problems with the existing generators is that the hydrocarbons of the liquid gas additives volatize very little at lower temperatures in the order of 0° F. or below. Thus, while the liquid gas additives volatize very easily in the order of 90° F., it is difficult to achieve a desired mixture of the industrial gas and the liquid gas additive at lower temperatures.

Electric heaters have been used to raise the temperature of the gas additive and the generator chamber, but such heaters are both expensive and dangerous to use.

Accordingly, it is a principal object of this invention to provide a means for applying additives to industrial gas which will automatically introduce the industrial gas either directly into the liquid gas additive or at a point above the level of the liquid gas additive depending upon the existing temperature within the generator. The device of this invention will automatically control the distance above or depth below the level of the liquid gas additive where the industrial gas is released, whereby the proportion of mixture is controlled.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

FIG. 1 is a vertical sectional view taken through the device of this invention; and FIG. 2 is a horizontal sectional view taken on line 2 — 2 of FIG. 1.

DESCRIPTION OF THE PREFERRED EMBODIMENT

A container 10 comprises top 12, bottom 14 and sides 16 to create an enclosed chamber. A liquid gas additive 18, such as that sold by Flamex Distributors, Inc., Clearwater, Fla., under the trademark "FLAMEX", is located in the bottom of the container 10. The gas additive 18 can be introduced into the container 10 through port 20 which is connected to a suitable source of the product (not shown).

An inlet port 22 is located in the top 12 of container 10 and is connected by conduit 23 to a source of industrial gas such as natural gas or propane. A rigid closed conduit 24 extends downwardly from port 22 and terminates at a point just above the liquid gas additive 18. A thermal spring 26 is connected to the lower end of conduit 24 by means of pin 28. The spring 26 terminates in a outwardly extending arm 30. The thermal spring has the conventional characteristic of contracting in cold temperatures and expanding in increased temperatures. Preferably, the arm 30 would be in the lowermost position shown by the dotted lines in FIG. 1 when the temperature within the container 10 is approximately −10° F. The arm 30 will be in the horizontal position shown in FIG. 1 when the temperature is approximately 50° F. The position of the arm shown by the uppermost dotted lines in FIG. 1 will be the position when the temperature within the container is approximately 90° F.

A bubbler element 32 is mounted on the outer end of arm 30 and includes a plurality of gas discharge orifices. A flexible conduit 34 extends between conduit 24 and the bubbler element 32 so that industrial gas within the conduit 24 can be discharged through the bubbler element.

A gas discharge port 36 is located in the top 12 of container 10 and is in turn connected to discharge conduit 37. A conventional bypass valve 38 connects conduit 23 and 37.

In operation, the gas additive 18 is introduced into container 10 through port 20 from any convenient source. A suitable valve (not shown) closes port 20.

Industrial gas is then introduced into the container through conduit 23 and port 22, and thence into conduit 24. If the temperature within the container 10 is in the order of −10° F., the thermal spring 26 will cause the bubbler element to be inserted within the body of the liquid additive 18. Thus, a mixture of the industrial gas and the gas additive will be easily effected even though the device is operating under condition of reduced temperature. The flexible conduit 34 permits the industrial gas to be imparted to the bubbler element 32 regardless of the angular position of the arm 30.

Even at a temperature of 50° F., the discharge of hydrocarbons from the liquid gas additive 18 is inhibited. However, the thermal spring 36 will maintain the arm 30 in a horizontal position close to the upper level of the gas additive 18 so that the mixture between the industrial gas and the escaping vapors from the gas additive will be enhanced.

With the operating temperatures being in the order of 90° F., the thermal spring 26 will raise the arm 30 to its uppermost position. At such temperatures, the volatization of the hydrocarbons of the gas additive 18 with respect to the supply of industrial gas may be 1 to 200 by volume. Thus, a proper mixture can be obtained with the industrial gas being discharged at a point substantially above the upper level of the gas additive 18.

From the foregoing, it is seen that this invention will automatically control the distance above or the depth below the gas additive where the industrial gas is released in full response to existing conditions of temperature, thereby controlling the proportion of the mixture in any given temperature. Thus, this invention will achieve at least all of its stated objectives.

I claim:

1. An apparatus for applying additives to industrial gas, comprising, a container having a top, a bottom and sides forming and enclosed chamber, an inlet port in said chamber adapted to be connected to a source of pressurized industrial gas, a quantity of liquid gas additive in the bottom of said chamber, a movable arm means mounted within said chamber, a gas discharge means on said arm means, said arm means being automatically temperature responsively movable from a first position wherein said gas discharge means is immersed in the liquid gas additive to a second position wherein said gas discharge means is positioned above said liquid gas additive, a thermal responsive element means connected to said arm means to cause said arm means to move between its said first and second positions so that said gas discharge means will be immersed in said liquid gas additive when the temperature within said chamber is at least 0° F, and to progressively rise out of and above said liquid gas additive when the temperature within said chamber is increased, conduit means connecting said inlet port and said gas discharge means so that said industrial gas is discharged within said liquid gas additive when said gas discharge means is submerged therein; and discharge above said liquid gas additive when said gas discharge means is positioned thereabove, and an outlet port in said chamber adapted to discharge the gas resulting from the mixture of said industrial gas and said liquid gas additive.

2. The device of claim 1 wherein said arm has an outer free end, said gas discharge means being mounted on said outer free end.

3. The device of claim 2 wherein said gas discharge means comprises a bubbler element having a plurality of gas discharging orifices mounted on the outer free end of said arm means.

4. The device of claim 1 wherein said thermal element means is a thermal spring.

5. The device of claim 1 wherein said conduit means is flexible.

6. The device of claim 1 wherein said conduit means includes a rigid conduit extending from said inlet port to a position above said liquid gas additive, and a flexible conduit extending from said rigid conduit to said gas discharge means.

7. The device of claim 6 wherein said arm is mounted on said rigid conduit.

* * * * *